US008452918B2

(12) United States Patent
Ding

(10) Patent No.: US 8,452,918 B2
(45) Date of Patent: May 28, 2013

(54) DRAM CONTROL METHOD AND THE DRAM CONTROLLER UTILIZING THE SAME

(75) Inventor: Jie Ding, Taipei (TW)

(73) Assignee: Via Technologies, Inc., Hsin-Tien, Taipei (TW)

( * ) Notice: Subject to any disclaimer, the term of this patent is extended or adjusted under 35 U.S.C. 154(b) by 289 days.

(21) Appl. No.: 12/855,566

(22) Filed: Aug. 12, 2010

(65) Prior Publication Data
US 2011/0125961 A1 May 26, 2011

(30) Foreign Application Priority Data

Nov. 26, 2009 (CN) .......................... 2009 1 0224941

(51) Int. Cl.
*G06F 13/14* (2006.01)
(52) U.S. Cl.
USPC ........... 711/105; 711/118; 711/154; 711/207; 711/211
(58) Field of Classification Search
USPC ............................. 711/105, 118, 154, 207, 211
See application file for complete search history.

(56) References Cited

U.S. PATENT DOCUMENTS

| 5,375,214 A * | 12/1994 | Mirza et al. .................. 711/207 |
| 8,117,422 B2 * | 2/2012 | Anderson et al. ............. 711/207 |
| 2003/0204702 A1 * | 10/2003 | Lomax et al. ................. 711/207 |
| 2004/0030834 A1 * | 2/2004 | Sharma ......................... 711/122 |
| 2005/0251664 A1 * | 11/2005 | Caprioli et al. ............... 712/228 |
| 2011/0125961 A1 * | 5/2011 | Ding ............................. 711/105 |

FOREIGN PATENT DOCUMENTS

CN 1732446 2/2006

OTHER PUBLICATIONS

English language translation of abstract of CN 1732446 (published Feb. 8, 2006).

* cited by examiner

*Primary Examiner* — Jae Yu
(74) *Attorney, Agent, or Firm* — McClure, Qualey & Rodack, LLP

(57) ABSTRACT

A Dynamic Random Access Memory (DRAM) controller for controlling read and write operations of a DRAM includes a storage unit and a control unit. The storage unit stores a first predetermined size of data including data written into the DRAM in response to a previous partial write request, and stores the corresponding store addresses of the first predetermined size of data in the DRAM. The control unit, in response to a read request, determines whether there exists any address in the store addresses equal to a read address of the read request, and read data corresponding to the read address from the storage unit when there exists same address in the store addresses equal to the read address.

18 Claims, 4 Drawing Sheets

DRAM CONTROL METHOD AND THE DRAM CONTROLLER UTILIZING THE SAME

CROSS REFERENCE TO RELATED APPLICATIONS

This Application claims priority of China Patent Application No. 200910224941.2, filed on Nov. 26, 2009, the entirety of which is incorporated by reference herein.

BACKGROUND OF THE INVENTION

1. Field of the Invention

The invention relates to a Dynamic Random Access Memory (DRAM) controller and DRAM control method, and more particularly to a DRAM controller and DRAM control method capable of compensating for performance degradation due to a Read-Modify-Write (RWM) operation in response to a partial write request.

2. Description of the Related Art

Currently, Dynamic Random Access Memory (DRAM) is widely used for data storage. Generally, read/write operations are controlled by a DRAM controller. FIG. 1 is a block diagram showing a conventional DRAM controller. As shown in FIG. 1, the DRAM controller 100 includes a control unit 101 and a merge unit 102, coupled to the DRAM 200 through a command bus 105 and a data bus 106, respectively. In response to a read/write request from a central processing unit (CPU) (not shown in FIG. 1), the DRAM controller 100 accordingly controls the read/write operation of the DRAM 200; thereby controlling data, requested by the CPU, to be read out from or written into the DRAM 200.

For DRAMs (such as the DRAM 200 shown in FIG. 1) supporting Error Correction Code (ECC), when receiving a partial write request, the DRAM controller 100 has to perform a Read-Modify-Write (RMW) operation on the DRAM 200 so as to correctly calculate an ECC for the data to be written into the DRAM 200. To be more specific, as known by the person with ordinary skilled in the art, the minimum data unit for the CPU to write data into the DRAM is 1 byte. However, the bandwidth of the bus disposed between the CPU and the DRAM is usually larger than 1 byte. As an example, the bus bandwidth may be 8 bytes. The request issued by the CPU to write data with a data size less than the bus bandwidth is called a partial write request. Meanwhile, the request to write data with a data size equal to the bus bandwidth is called a normal write request or simply called a write request. Because the ECC error correction is performed based on 8 bytes as a minimum data unit, for data to be written, which is requested via a partial write request (for example, the partial write data is the data with 1 byte data size), calculation of the ECC is incorrect. To solve this problem, when receiving a partial write request, the control unit 101 sends out a read command via the command bus to the DRAM 200 so as to read out data with a burst length, including the data on the partial write address of the partial write request, to the merge unit 102 (read operation). Next, the merge unit 102 merges the read data with the partial write data corresponding to the partial write request. That is, the merge unit 102 replaces the data, on the partial write address of the partial write request, read out from DRAM by the partial write data (modify operation). Finally, the control unit 101 writes the merged data to the DRAM 200 (write operation) so as to complete the partial write request.

As previously described, for a partial write request, three operations have to be successively performed. Therefore, the time required for a partial write request is long. When the DRAM controller receives multiple partial write requests within a short period of time, DRAM performance is seriously degraded.

Therefore, a novel DRAM controller and DRAM control method is highly required to compensate for performance degradation due to the RWM operation in response to a partial write request.

BRIEF SUMMARY OF THE INVENTION

A DRAM controller and DRAM control method are provided. An exemplary embodiment of a DRAM controller includes a storage unit and a control unit. The storage unit stores a first predetermined size of data, including data written into the DRAM in response to a previous partial write request, and stores store addresses of the first predetermined size of data in the DRAM. The control unit, in response to a read request, determines whether there exists any address in the store addresses equal to a read address of the read request, and reads data corresponding to the read address from the storage unit when there exists same address in the store addresses equal to the read address.

An exemplary embodiment of a DRAM control method utilized by a DRAM controller is provided, wherein the DRAM controller controls read and write operations of a DRAM and includes a storage unit, including: storing a first predetermined size of data, including data written into the DRAM in response to a previous partial write request, and store addresses of the first predetermined size of data in the DRAM into the storage unit; and in response to a read request, determining whether there exists any address in the store addresses equal to a read address of the read request, and reading data corresponding to the read address from the storage unit when there exists same address in the store addresses equal to the read address.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

In the following paragraphs, some embodiments of the DRAM controller and DRAM control method are described and reference may be made to the figures. In the figures, the same symbols represent the same elements. Note that the description is made for the purpose of illustrating the concept of the invention and should not be taken in a limiting sense.

Figure 2:
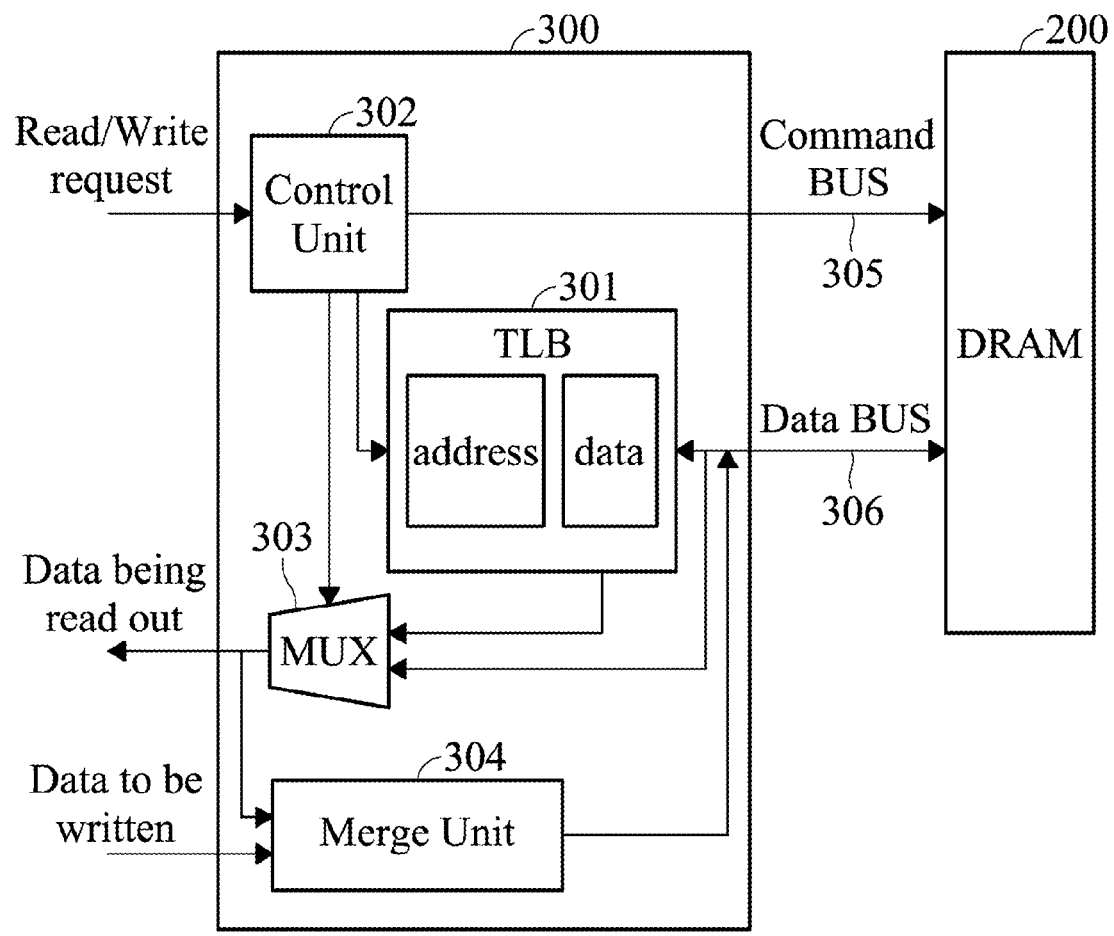
FIG. 2 shows a DRAM controller according to an embodiment of the invention.

To begin, FIG. 2 shows a DRAM controller according to an embodiment of the invention.

As shown in FIG. 2, the DRAM controller 300 includes a Table Look aside Buffer (TLB) 301, a control unit 302, a multiplexing unit (MUX) 303 and a merge unit 304.

The DRAM controller 300 is coupled to the DRAM 200 via the command bus and the data bus, receives read/write requests from an external device such as a CPU (not shown), and controls the read/write operations of the DRAM 200 according to the received requests.

The TLB 301 stores a first predetermined size of data, including data written into the DRAM in response to a previous partial write request, and stores the corresponding store addresses of the first predetermined size of data in the DRAM. The first predetermined size may be the same size as or a multiple times longer than a burst data length, and is preferably equal to one burst data length.

To be more specific, as will be described in more detail in the following paragraphs, when receiving a partial write request from a CPU, if the first predetermined size of data including data on the partial write address of the partial write request stored in the DRAM 200 has not been pre-stored in the TLB 301, the control unit 302 reads the first predetermined size of data including data on the partial write address of the partial write request from the DRAM 200, and stores into the TLB 301. Next, the merge unit 304 merges a second predetermined size of data including data on the partial write address of the partial write request in the TLB 301 with the partial write data corresponding to the partial write request. On the other hand, if first predetermined size of data has already been pre-stored in the TLB 301, the merge unit 304 merges the second predetermined size of data including data on the partial write address of the partial write request in the TLB 301 with the partial write data corresponding to the requested write address. In either conditions, in addition to being stored in the DRAM 200, the merged data is further stored in the TLB 301 to replace the corresponding data originally stored on the same address, so that it may be provided in response to a subsequent read or partial write request. In addition to the merged data, the control unit 302 further stores the corresponding store addresses of the first predetermined size of data in the DRAM into the TLB 301. The TLB 301 may correspondingly store the data and store addresses in the form of a lookup table, or may use any other proper data structure to store the data and store addresses. The second predetermined size may be smaller than or equal to the first predetermined size. As an example, the second predetermined size may equal to or may be a multiple times longer than a bandwidth of a bus disposed between an external device and the DRAM controller, and is preferably equal to the bandwidth of the bus.

In the embodiments of the invention, there is a trade off between the number of gates (gate-count) of the DRAM controller 300 and the hit rate so as to determine the size of the TLB 301 (that is, the depth of the lookup table to store the data and store addresses). The hit rate is a ratio of a read/write address corresponding to a read/write request that hits the store addresses stored in the TLB 301 to a total number of the stored store addresses in the TLB 301. If the depth of the TLB is large, the compensation effect is good, but the gate-count is large. On the other hand, when the depth of the TLB is small, the gate-count is small, but the compensation effect is poor. When implemented in practice, the size of the TLB 301 may be determined according to different requirements.

The control unit 302 controls read/write operations of the TLB 301 and the DRAM 200. In addition, the control unit 302 determines the request type received by the controller 300 from the CPU, and accordingly executes operations as will be described below. Note that, how the control unit 302 determines the request type, is well known to those with ordinary skill in the art and the descriptions are omitted here for brevity.

When the control unit 302 determines that the received request is a read request, the control unit 302 uses the read address of the read request (hereinafter called the read address) to look up the TLB 301; that is, to compare the read address with the store addresses stored in the TLB 301 so as to determine whether there exists any address in the store addresses equal to the read address. When there exists same address in the store addresses equal to a read address (that is, the read address 'hits' TLB 301), which means that the data requested to be read in response to the read request has already been pre-stored in the TLB 301. Therefore, the control unit 302 reads the data corresponding to the read address from the TLB 301, and provides the read data to the MUX 303. The control unit 302 further issues a first indication to the MUX 303 to indicate the MUX 303 to provide the read data to the CPU. On the other hand, when there exists no address in the store addresses equal to the read address (that is, the read address 'does not hit' TLB 301), it means that the data requested to be read in response to the read request has not been stored in the TLB 301. Therefore, the control unit 302 issues a read command via the command bus to the DRAM 200 so as to read data on the read address. The read data is further provided to the MUX 303 via the data bus. The control unit 302 further issues a second indication to the MUX 303 to indicate the MUX 303 to provide the read data to the CPU.

When the control unit 302 determines that the received request is a partial write request, the control unit 302 uses the partial write address of the partial write request (hereinafter called the partial write address) to look up the TLB 301; that is, to compare the partial write address with the store addresses stored in the TLB 301 so as to determine whether there exists any address in the store addresses equal to the partial write address. When there exists same address in the store addresses equal to a partial write address (that is, the partial write address 'hits' TLB 301), it means that a first predetermined size of data, including data on the partial write address, stored in the DRAM 200 has already been pre-stored in the TLB 301. Therefore, the control unit 302 reads a second predetermined size of data stored in the TLB 301, including the data on the partial write address, according to the partial write address, and provides the read data to the MUX 303. The control unit 302 further issues a third indication to the MUX 303 to indicate the MUX 303 to provide the second predetermined size of data to the merge unit 304. On the other hand, when there exists no address in the store addresses equal to the partial write address (that is, the partial write address 'does not hit' TLB 301), it means that the first predetermined size of data, including data on the partial write address, stored in the DRAM 200 has not been stored in the TLB 301. Therefore, the control unit 302 issues a read command via the command bus to the DRAM 200 so as to read the first predetermined size of data including data on the partial write address from the DRAM 200 and stores the first predetermined size of data and the corresponding store addresses in the DRAM 200 into the TLB 301. Next, the control unit 302 reads a second predetermined size of data including the data on the partial write address from the TLB 301, and provides to the MUX 303. The control unit 302 further issues the third indication to the MUX 303 to indicate the MUX 303 to provide the second predetermined size of data to the merge unit 304. When the merge unit 304 completes merging the second predetermined size of data with the partial write data, the control unit 302 further controls the merge unit 304 to store the merged data into the DRAM 200 and the TLB 301 so as to replace the corresponding data in DRAM 200 and TLB 301 with the merged data. The method for replacing the data is well-known in the art and is omitted here for brevity.

When the control unit 302 determines that the received request is a normal write request, the control unit 302 writes the data requested to be written into DRAM via the merge unit 304 according to the normal write address of the normal write request (hereinafter called the normal write address). In addition, the control unit 302 further uses the normal write address to look up the TLB 301 so as to determine whether there exists any address in the store addresses in the TLB 301 equal to the normal write address. When there exists same address in the store addresses in the TLB 301 equal to the normal write address (that is, the normal write address 'hits' TLB 301), it means that the data including data on the normal write address stored in the DRAM 200 has already been pre-stored in the TLB 301. Therefore, in order to synchronize the data on the normal write address in the TLB 301 and the DRAM 200, the control unit 302 writes the normal write data requested by the normal write request into the TLB 301 so as to replace a corresponding stored data. On the other hand, when there is no address in the store addresses in the TLB 301 equal to a normal write address, the control unit 302 does not execute the above-mentioned replacement operation.

For implementation, the MUX 303 may be a selector. As previously described, the MUX 303 selectively provide the data at the input terminal to the CPU or the merge unit 304 in response to the first, second or third indication.

The merge unit 304 merges the partial write data requested by the partial write request with the second predetermined size of data provided by the MUX 303. That is, the partial write data requested by the partial write request is used to replace the data on the corresponding partial write address in the second predetermined size of data. The merge unit 304 further writes the merged data into the DRAM 200 and the TLB 301 to replace the corresponding data under the control of control unit 302.

In the following paragraphs, reference may be made to FIG. 3A and FIG. 3B and the method for controlling DRAM according to the embodiment of the invention will be introduced. The control method may be executed by the DRAM controller as shown in FIG. 2.

Figure 3A:
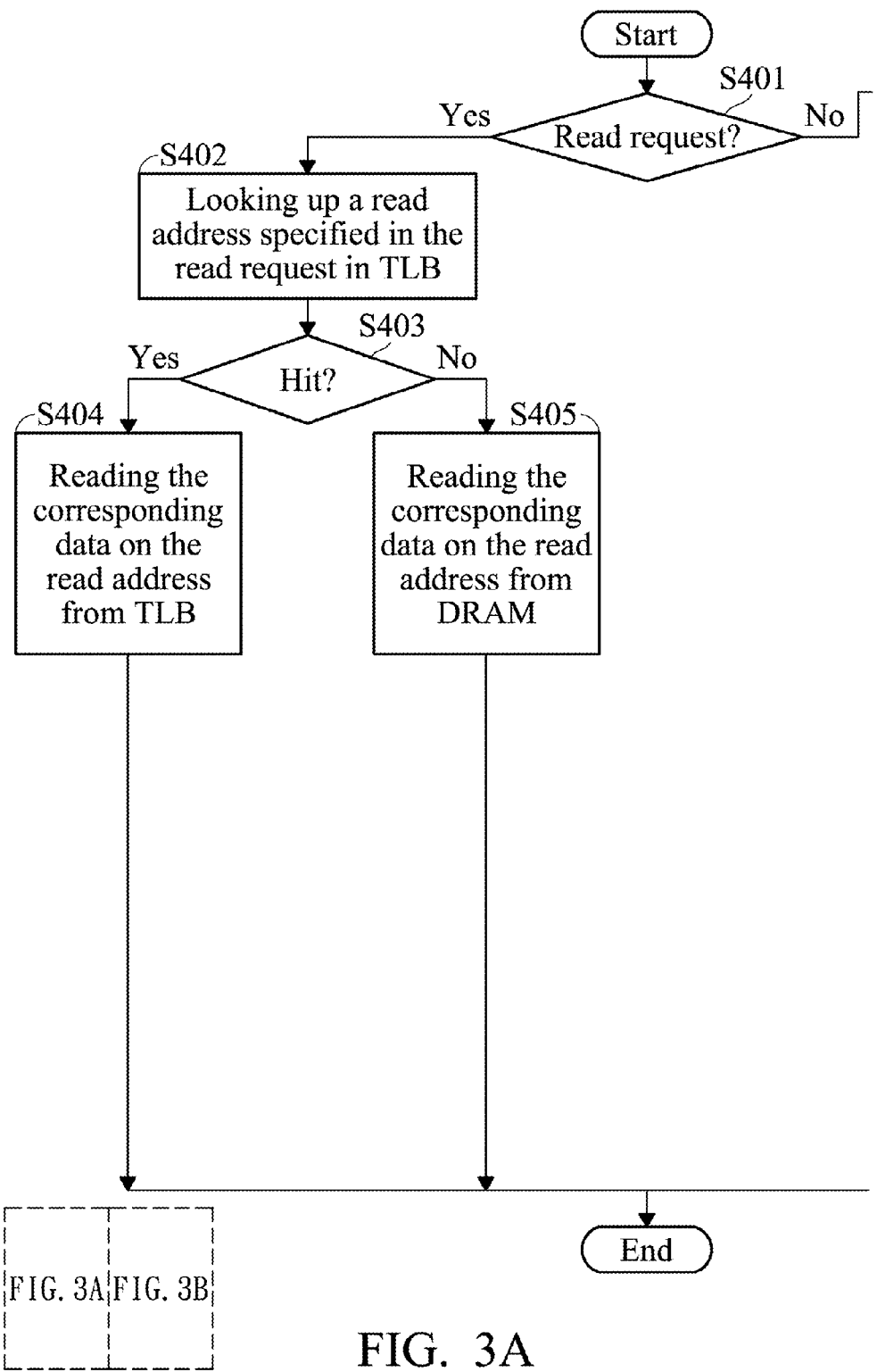
FIGS. 3A and 3B show a flow chart of a method for controlling DRAM according to an embodiment of the invention.
Figure 3B:
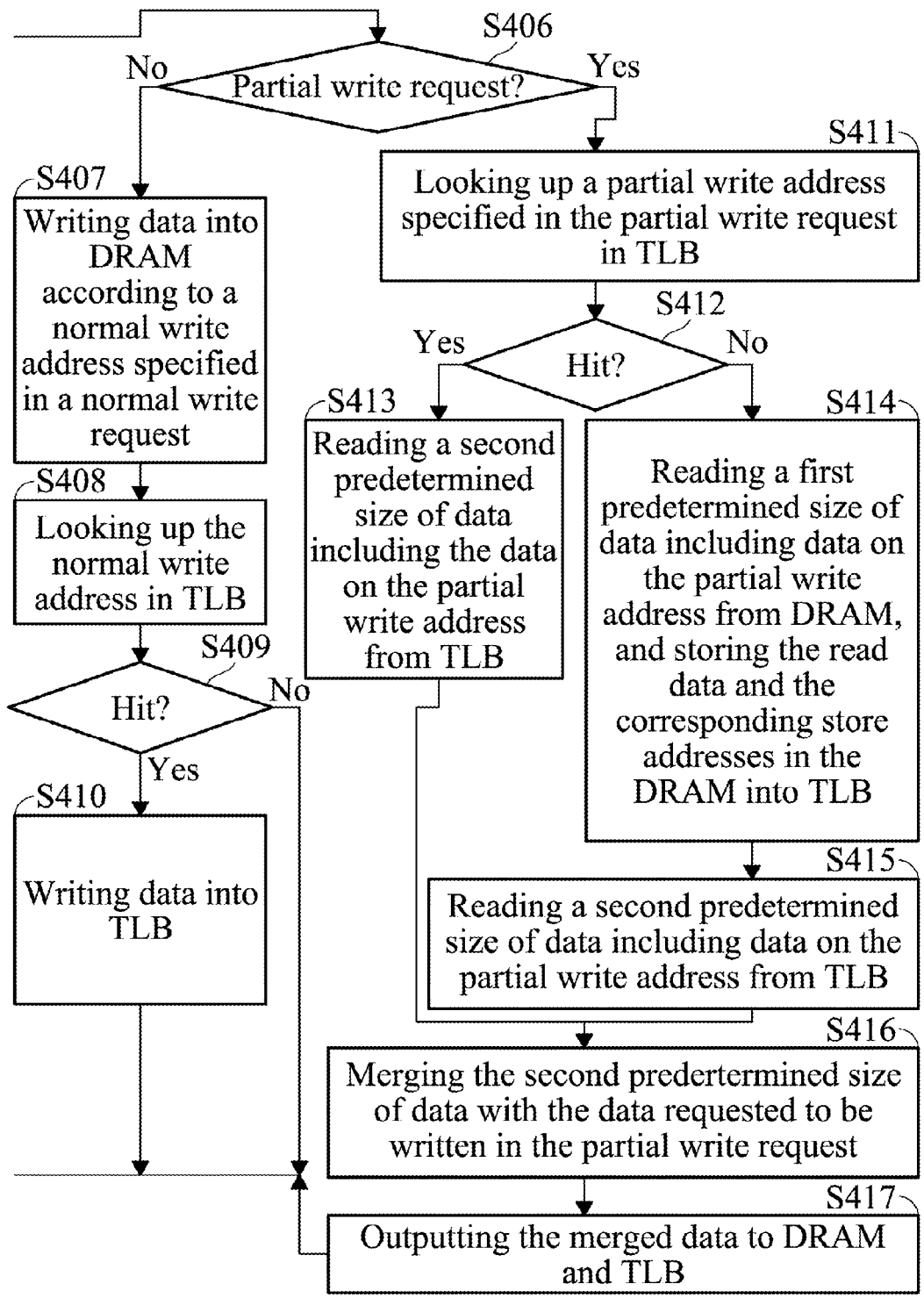

As shown in FIG. 3A and FIG. 3B, when the DRAM controller 300 receives the requests from an external device such as a CPU, the control unit 302 determines whether a received request is a read request in Step S401.

When the received request is a read request, in step S402, the control unit 302 looks up a read address specified in the read request in the TLB 301 and determines whether there exists any store address in the TLB 301 equal to the read address in step S403; that is, whether the read address 'hits' TLB 301. When the read address hits TLB 301, in step S404, the control unit 302 read the corresponding data on the read address from the TLB 301. The read data is provided to the MUX 303. In addition, the control unit 302 further issues a first indication to the MUX 303 so as to indicate the MUX 303 to provide the read data to the CPU. On the other hand, when the read address does not hit TLB 301, in step S405, the control unit 302 issues a read command via the command bus to the DRAM 200, so as to read the corresponding data on the read address from the DRAM 200. The read data is provided to the MUX 303 via the data bus. In addition, the control unit 302 further issues a second indication to the MUX 303 to indicate the MUX 303 to provide the data read from the DRAM 200 to the CPU.

On the other hand, in step S401, when the received request is determined to not be a read request, in step S406, the control unit 302 further determines whether the request is a partial write request. The step of determining whether the request is a partial write request is well known in the art. For example, the control unit 302 may determine whether the data size requested to be written in the write request is equal to the bus bandwidth according to the sign bit BYTE ENABLE configured for every byte in the write request; thereby determining whether the write request is a partial write request. For another example, a partial write request sign bit may be configured in the received request so as to indicate that the write request is a partial write request.

When the request is determined, in step S406, to not be a partial write request but a normal write request, the control unit 302 writes the data requested to be written into DRAM 200 according to the normal write address specified in a normal write request (hereinafter called the normal write address) via the merge unit 304 in step S407. Next, in step S408, the control unit 302 looks up the normal write address in the TLB 301 and determines, in step S409, whether there exists same address in the TLB 301 equal to the normal write address; that is, whether the normal write address hits TLB 301. When the normal write address hits TLB 301, in step S410, the control unit 302 writes data requested to be written corresponding to the normal write request into the TLB 301 so as to replace the corresponding stored data in the TLB 301. Otherwise, in step S409, when the normal write address does not hit TLB 301, the process is ended and the above-mentioned replacement operation is not performed.

On the other hand, in step S406, when the received request is determined to be a partial write request, the control unit 302 looks up a partial write address specified in the partial write request in the TLB 301 (hereinafter called the partial write request), and determines, in step S412, whether there exists same address in the TLB 301 equal to the partial write address; that is, whether the partial write address hits TLB 301. When the partial write address hits TLB 301, in step S413, the control unit 302 reads a second predetermined size of data including the data on the partial write address from the TLB 301, and provides the read data to the MUX 303. In addition, the control unit 302 further issues a third indication to the MUX 303 so as to indicate the MUX 303 to provide the data with the second predetermined size read from the TLB 301 to the merge unit 304. Otherwise, in step S412, when the partial write address does not hit TLB 301, the control unit 202 issues a read command via the command bus to the DRAM 200 so as to, in step S414, read a first predetermined size of data including data on the partial write address from the DRAM 200, and store the read data and the corresponding store addresses in the DRAM into the TLB 301. Next, in step S415, the control unit 302 reads a second predetermined size of data including data on the partial write address from the TLB 301 and provides the read data to the MUX 303. The control unit 302 further issues a third indication to the MUX 303 so as to indicate the MUX 303 to provide the second predetermined size of data to the merge unit 304.

Next, in step S416, the merge unit 304 merges the second predetermined size of data provided by the MUX 303 with the data requested to be written in the partial write request (that is, partial write data requested by the partial write request), and outputs the merged data to the DRAM 200 and the TLB 301 so as, in step S417, to replace the corresponding data stored therein.

As previously described, in the DRAM control method according to the embodiment of the invention, the merged data is stored into the TLB 301 every time when the partial write request is executed. Therefore, when a read request or a partial write request is subsequently received, if the requested data has already been stored in the TLB 301, the data may be directly read from the TLB 301 instead of being read from the DRAM as in the conventional method. Therefore, the time required for executing a request is greatly reduced and performance degradation of the DRAM controller due to the RMW operation is minimized.

Figure 1:
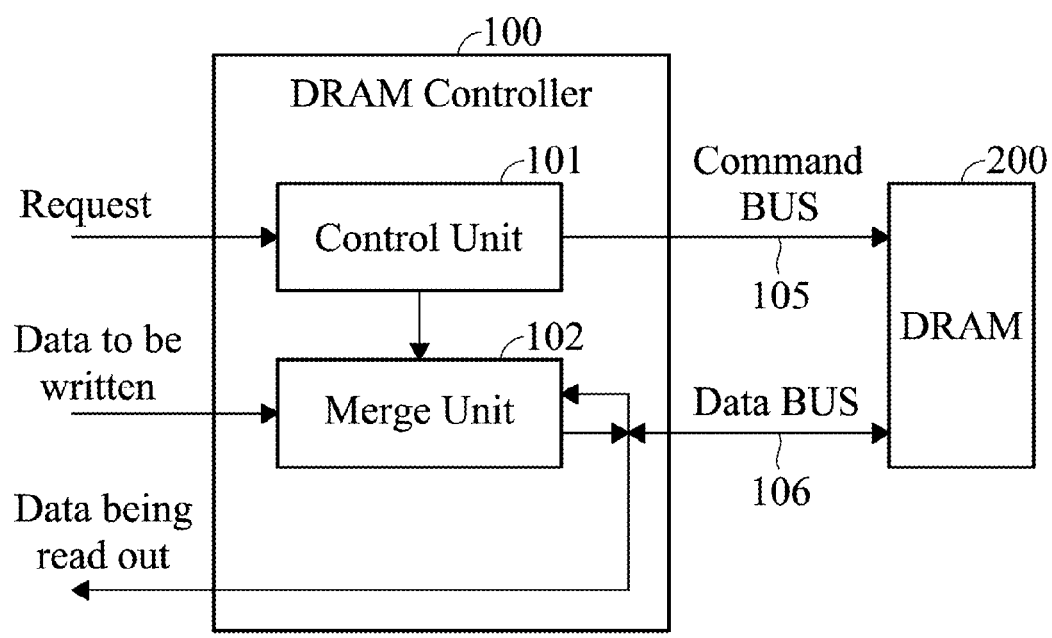
FIG. 1 is a block diagram showing a conventional DRAM controller.

In the above description, a DRAM controller and a DRAM control method according to the embodiments of the invention are introduced. Note that the descriptions herein illustrate the concept of the invention, and does not limit the scope of the invention. Those who are skilled in this technology can make various alterations and modifications to the DRAM controller and DRAM control method according to different requirements. As an example, a modification in the embodiment may be made by adding an ENABLE or DISABLE signal to the TLB 301 and the MUX 303 so as to control activation of the two elements. To be more specific, when the control unit 302 adds the ENABLE signal to the TLB 301 and the MUX 303, the TLB 301 and the MUX 303 may be activated and work as previously described so as to execute the DRAM control method according to the embodiment of the invention in company with the control unit 302 and merge unit 304. On the other hand, when the control unit 302 adds the DISABLE signal to the TLB 301 and the MUX 303, the TLB 301 and the MUX 303 may be disabled. At this time, the control unit 302 and merge unit 304 do not execute the DRAM control method according to the embodiment of the invention and may operate as the conventional DRAM controller 100 as shown FIG. 1.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A Dynamic Random Access Memory (DRAM) controller for controlling read and write operations of a DRAM comprising:
   a storage unit, storing a first predetermined size of data, comprising data written into the DRAM in response to a previous partial write request, and storing store addresses of the first predetermined size of data in the DRAM;
   a control unit, in response to a partial write request, determining whether there exists any address in the store addresses equal to a partial write address of the partial write request; and
   a merge unit,
   wherein when there exists same address in the store addresses equal to the partial write address of the partial write request, the merge unit merges a second predetermined size of data stored in the storage unit, comprising the data on the partial write address, with data requested to be written in the partial write request, and writes the merged data into the DRAM and the storage unit.

2. The DRAM controller as claimed in claim 1, wherein when receiving a normal write request, the control unit writes data requested to be written in the normal write request into the DRAM according to a normal write address of the normal write request.

3. The DRAM controller as claimed in claim 2, wherein the control unit further determines whether there exists any address in the store addresses equal to the normal write address of the normal write request, and writes the data requested to be written in the normal write request into the storage unit so as to replace the corresponding data stored in the storage unit when there exists same address in the store addresses equal to the normal write address of the normal write request.

4. The DRAM controller as claimed in claim 1, wherein when receiving a read request, the control unit determines whether there exists any address in the store addresses equal to a read address of the read request, and reads data corresponding to the read address from the storage unit when there exists same address in the store addresses equal to the read address.

5. The DRAM controller as claimed in claim 4, wherein when there exists no address in the store addresses equal to the read address, the control unit reads data corresponding to the read address from the DRAM.

6. The DRAM controller as claimed in claim 1, wherein when there is no address in the store addresses equal to the partial write address of the partial write request, the control unit reads the first predetermined size of data, comprising the data on the partial write address, from the DRAM, and the merge unit merges the second predetermined size of data comprising the data on the partial write address comprised in the first predetermined size of data with the data requested to be written in the partial write request, and writes the merged data into the DRAM and the storage unit.

7. The DRAM controller as claimed in claim 1, wherein the first predetermined size is a burst data length, and the second predetermined size is a bandwidth of a bus disposed between an external device and the DRAM controller.

8. The DRAM controller as claimed in claim 1, wherein the storage unit is a Table Look aside Buffer (TLB).

9. The DRAM controller as claimed in claim 1, wherein the data and the store addresses are correspondingly stored in the storage unit in the form of a lookup table.

10. A Dynamic Random Access Memory (DRAM) control method utilized by a DRAM controller, wherein the DRAM controller controls read and write operations of a DRAM and comprises a storage unit, and the method comprises:
    storing a first predetermined size of data, comprising data written into the DRAM in response to a previous partial write request, and store addresses of the first predetermined size of data in the DRAM into the storage unit;
    in response to a partial write request, determining whether there exists any address in the store addresses equal to a partial write address of the partial write request; and
    when there exists same address in the store addresses equal to the partial write address of the partial write request, merging a second predetermined size of data stored in the storage unit, comprising the data on the partial write address, with data requested to be written in the partial write request, and writing the merged data into the DRAM and the storage unit.

11. The DRAM control method as claimed in claim 10, further comprising:
    when receiving a normal write request, writing data requested to be written in the normal write request into the DRAM according to a normal write address of the normal write request.

12. The DRAM control method as claimed in claim 11, further comprising:
    determining whether there exists any address in the store addresses equal to the normal write address of the normal write request; and
    writing the data requested to be written in the normal write request into the storage unit so as to replace the corresponding data stored in the storage unit when there exists same address in the store addresses equal to the normal write address of the normal write request.

13. The DRAM control method as claimed in claim 10, further comprising:
when receiving a read request, determining whether there exists any address in the store addresses equal to a read address of the read request; and
when there exists same address in the store addresses equal to the read address of the read request, reading data corresponding to the read address from the storage unit.

14. The DRAM control method as claimed in claim 13, further comprising:
reading data corresponding to the read address from the DRAM when there exists no address in the store addresses equal to the read address.

15. The DRAM control method as claimed in claim 10, further comprising:
when there is no address in the store addresses equal to the partial write address of the partial write request, reading the first predetermined size of data, comprising the data on the partial write address, from the DRAM;
merging the second predetermined size of data comprising the data on the partial write address comprised in the first predetermined size of data with the data requested to be written in the partial write request; and
writing the merged data into the DRAM and the storage unit.

16. The DRAM control method as claimed in claim 10, wherein the first predetermined size is a burst data length, and the second predetermined size is a bandwidth of a bus disposed between an external device and the DRAM controller.

17. The DRAM control method as claimed in claim 10, wherein the storage unit is a Table Look aside Buffer (TLB).

18. The DRAM control method as claimed in claim 10, wherein the data and the store addresses are correspondingly stored in the storage unit in the form of a lookup table.

\* \* \* \* \*